United States Patent [19]

Doerr et al.

[11] Patent Number: 4,602,875
[45] Date of Patent: Jul. 29, 1986

[54] COMBINED BEARING, ROTATABLE MEMBER AND SHIELD ASSEMBLY

[75] Inventors: Elmer H. Doerr, Norwalk; Edward W. Molloy, Port Clinton, both of Ohio

[73] Assignee: General Motors Corporation, Detroit, Mich.

[21] Appl. No.: 799,142

[22] Filed: Nov. 18, 1985

[51] Int. Cl.$^4$ ............ F16C 13/02; F16C 33/80; F16C 33/76; F16H 55/00
[52] U.S. Cl. .................. 384/547; 384/477; 384/488; 384/543; 19/3
[58] Field of Search ............ 384/480, 488, 489, 477, 384/510, 537, 543, 544, 546, 547, 588; 474/113

[56] References Cited

U.S. PATENT DOCUMENTS

| | | | |
|---|---|---|---|
| 2,349,281 | 5/1944 | Kendall. | |
| 2,582,525 | 1/1952 | Brown | 384/477 |
| 2,669,878 | 2/1954 | Nelson. | |
| 3,672,736 | 6/1972 | Rathbone | 384/488 |
| 4,019,789 | 4/1977 | Rosin et al. | 384/543 |
| 4,033,643 | 7/1977 | Miller et al. | 384/488 |
| 4,177,685 | 12/1979 | DeLancey | 474/113 |

Primary Examiner—Stuart S. Levy
Assistant Examiner—Thomas R. Hannon
Attorney, Agent, or Firm—Patrick M. Griffin

[57] ABSTRACT

A combined bearing, pulley and shield assembly that is temporarily unitized prior to being installed on a cylindrical shaft support. A bearing having inner and outer races with an annular space between the races is molded into the hub off the pulley with a pair of shields joined to the pulley in covering relation to the annular space. The shields are joined to the pulley by frangible tabs molded integrally with the pulley. When the pulley assembly is installed, the shields are precisely positioned and fixed to the inner race. Therefore, the tabs fracture in response to initial relative rotation of the pulley and inner race to allow free subsequent relative rotation.

3 Claims, 3 Drawing Figures

COMBINED BEARING, ROTATABLE MEMBER AND SHIELD ASSEMBLY

This invention relates to rotatable assemblies in general, and specifically to a combined bearing, rotatable member and shield assembly that is temporarily unitized, prior to being installed on a support.

BACKGROUND OF THE INVENTION

Rotatable assemblies, such as pulleys, are used in such automotive applications as drive belt idlers and drive belt tensioners. It is known, in general, to mold pulleys from a plastic material, as shown in the U.S. Pat. No. 4,177,685 to DeLancey. Pulley assemblies having a moldable plastic pulley with a ball bearing molded into the central hub of the pulley are also known. It is also known to provide a bearing to which a shield is joined as a unitized assembly. The U.S. Pat. No. 4,033,643 to Miller et al. shows a unitized bearing assembly having a shield 16 that is joined to an inner race 11 by snap fitting it into a groove 11A. The grinding of the groove 11A is an additional manufacturing step, and the precision with which shield 16 is radially and axially positioned relative to the bearing assembly depends on the precision with which the groove 11A is ground. While unitization of a rotatable assembly simplifies its shipping and installation, the necessity of additional and precisely controlled manufacturing steps generally adds expense. It would be desirable, therefore, to provide a rotatable assembly including a rotatable member, bearing and shield that was unitized prior to installation, but which did not require additional manufacturing steps to unitize it or precise positioning of the shield prior to installation.

SUMMARY OF THE INVENTION

The subject invention provides a combined bearing, rotatable member and shield assembly that is unitized by a frangible means that joins the shield to the rotatable member. The frangible means may be formed integrally with the rotatable member as it is formed, and need only be sufficiently strong to join the shield to the rotatable member prior to installation of the combined assembly on a cylindrical shaft support. The shield need only be approximately positioned prior to installation, as it obtains a precise positioning during installation. After the combined assembly is installed, the frangible means fractures, so the unitization of the assembly is temporary. Furthermore, the shield can cooperate with a rubbing seal already in the bearing to provide additional sealing.

The bearing of the combined assembly of the invention is a radial ball bearing having an inner race with a central bore therethrough and a relatively rotatable outer race that defines an annular space with the inner race. Both the inner and the outer races include a pair of annular faces that radially border each side of the annular space between the races. In the preferred embodiment, the inner race has a slightly greater axial width, measured between its two faces, than does the outer race. In addition, a pair of rubbing seals is fitted to the outer race on either side of the annular space, each of which includes a seal lip that engages the inner race to provide primary sealing for each side of the annular space.

The rotatable member of the combined assembly of the invention is a pulley fixed to the outer bearing race so as to be rotatable relative to the inner race. In the preferred embodiment, the pulley is molded of a suitable plastic material, and is fixed to the outer race by forming the pulley around the outside of the outer race after a shield is put in place, described next.

The shield of the combined assembly of the invention is a generally flat annular member that has an inner and an outer circular edge. The diameter of the inner circular edge is substantially equal to the diameter of the inner race central bore, and the outer circular edge has a diameter somewhat larger than the diameter of the outside of the outer race. These dimensions of the shield assure that the shield can cover one side of the annular space between the races, with the inner circular edge of the shield substantially coaxial to the central bore. In addition, when it is placed in covering relation to the annular space, the outer circular edge of the shield extends radially beyond the outside the outer race to serve as an attachment portion for the shield, as described below. Two shields are used, in the preferred embodiment, in order to cover both sides of the annular space between the bearing races.

Before the pulley is molded, a shield is placed in approximate covering relation to each side of the annular space between the bearing races. The bearing and the approximately positioned shields are then put into a suitable mold. Plastic material is then injected into the mold so as to form the pulley around the outside of the outer race. As the pulley is being molded, a portion of the plastic material is molded over the outer circular edge of each shield to form tabs integral with the pulley. These tabs comprise a frangible means that is sufficiently strong to join the shields to the pulley, and thereby unitize the assembly. The unitization is temporary, however, since the tabs fracture after installation, as described below.

The combined assembly is installed on the cylindrical shaft support by fitting the cylindrical shaft through the inner race bore and fixing the inner race to the shaft with a nut and washer assembly that clamps the shields against the faces of the inner race. The shields are thereby fixed to the inner race so that they do not turn relative to the outer race. As the assembly is installed, the inner circular edge of each shield and the portion of each shield adjacent to the inner circular edge together provide a positioning portion for the shields. The inner circular edge of each shield engages the cylindrical shaft, which precisely radially positions the shields in covering relation to the annular space between the bearings. Concurrently, the portion of each shield adjacent the inner circular edge, as it is clamped against the face of the inner race, precisely axially positions the shields in covering relation to the annular space. Furthermore, each shield is slightly axially spaced from a respective face of the axially narrower outer race.

The tabs are not sufficiently strong to withstand the force of relative rotation between the pulley and the inner race. Therefore, after installation, the tabs fracture in response to initial relative rotation between the pulley and inner race to allow free subsequent relative rotation. Furthermore, after the tabs fracture, the slight axial clearances of the shields from the faces of the outer race cooperate with the rubbing seal lips, which engage the inner race, to effectively create a labyrinth seal of each side of the annular space. The labyrinth seal works in addition to the primary sealing of the rubbing seals, although the shields would still act to shield the annular space between the races in the absence of rubbing seals.

It is, therefore, an object of the invention to provide a combined bearing, rotatable member and shield assembly that is temporarily unitized prior to being installed on a support, a combined assembly in which the bearing has relatively rotatable inner and outer races defining an annular space therebetween with one of the races adapted to be fixed on the support to install the assembly, and in which the rotatable member is fixed to the other of the races so as to be rotatable relative to the one race, and in which the shield is adapted to cover one side of the annular space, the shield further including a positioning portion engageable with the support and one race when the assembly is installed on the support to thereby fix the shield relative to the one race and precisely position the shield in covering relation to the annular space, an assembly which further includes a frangible means that is sufficiently strong to join the shield to the rotatable member in approximate covering relation to the one side of the annular space prior to installing the assembly, which thereby temporarily unitizes the assembly, and in which the frangible means is insufficiently strong to withstand the force of relative rotation between the rotatable member and the one race after the assembly has been installed on the support, so that the frangible means will fracture in response to initial relative rotation between the rotatable member and one race, thereby allowing free subsequent relative rotation.

It is another object of the invention to provide a combined assembly of the type described in which the bearing further includes a rubbing seal on one side of the annular space with a seal lip that engages the one race, and in which the positioning portion of the shield, as the assembly is installed, engages the support to precisely radially position the shield in covering relation to the annular space and also engages the one race to both fix the shield relative to the one race and precisely axially position the shield in covering relation to the annular space with a slight clearance from the other race, so that, after the frangible means fractures in response to initial relative rotation between the rotatable member and one race, the slight axial clearance of the shield from the other race then cooperates with the rubbing seal lip to effectively create a labyrinth seal of the annular space.

It is yet another object of the invention to provide a combined assembly of the type described in which the rotatable member is formed of a plastic material molded to the other of the races, and in which the shield also includes an attachment portion that extends radially beyond the other race when the shield is placed in approximate covering relation to the annular space prior to the rotatable member being molded to the other race, so that, when the rotatable member is molded to the other race, a frangible means comprising a portion of the plastic material of the rotatable member may be molded integrally with the rotatable member over the shield attachment portion, with the plastic material portion being sufficiently strong to join the shield to the rotatable member to temporarily unitize the assembly, but being insufficiently strong to withstand the force of relative rotation between the rotatable member and the one race after the assembly is installed on the support, so that the plastic material portion will fracture in response to initial relative rotation between the rotatable member and one race to allow free subsequent relative rotation.

DESCRIPTION OF THE PREFERRED EMBODIMENTS

These and other objects and features of the invention will appear from the following written description and drawings, in which.

Figure 1:
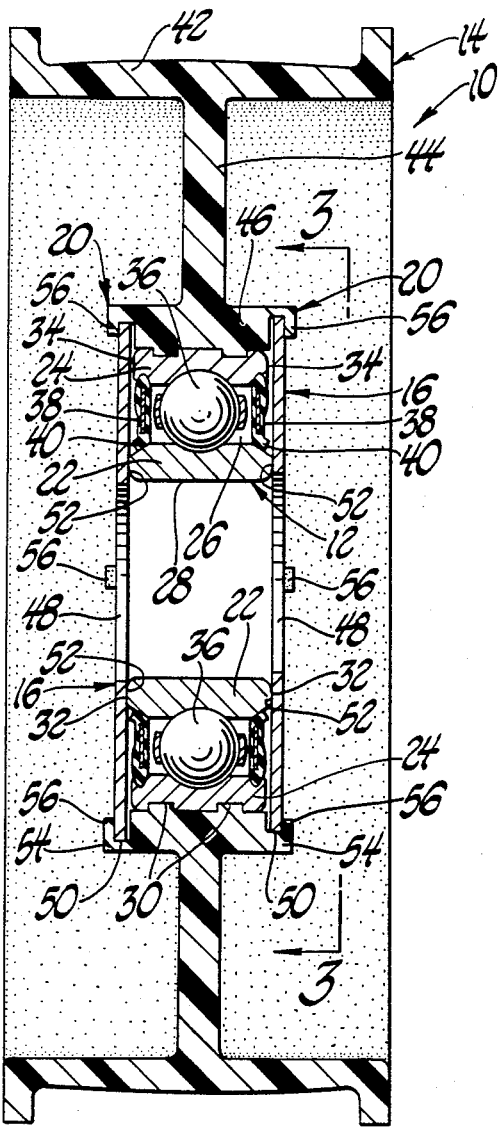
FIG. 1 is a cross sectional view of the preferred embodiment of the invention before installation.

Referring first to FIG. 1, the preferred embodiment of the combined bearing, rotatable member and shield assembly of the invention is designated generally at 10. The preferred embodiment of the invention disclosed could be used in an automotive application, such as the idler pulley for an accessory drive belt, or as the belt engaging pulley for an accessory drive belt tensioner. The basic structural elements of the combined assembly 10 are a radial bearing designated generally at 12, a rotatable member, which is a pulley designated generally at 14, and a pair of identical shields designated generally at 16. Each of the structural elements will be described below. However, it will be noted, in FIG. 1, that the shields 16 are joined to the bearing 12 and pulley 14 by a frangible means, designated generally at 20, thereby creating a unitized assembly. The frangible means 20 is intended to fracture after installation of the combined assembly 10 on a support, such as a cylindrical shaft 18 seen in FIG. 2. Therefore, the unitization is temporary only.

Referring again to FIG. 1, the bearing 12 of the combined assembly 10 is a conrad assembled, radial ball bearing having an inner race 22 and a coaxial outer race 24 that define an annular space 26 therebetween. Inner race 22 has a central bore 28 therethrough with a diameter substantially equal to the diameter of cylindrical shaft 18. The outside of outer race 24 has a pair of knurled grooves, 30, which serve a purpose to be described below. Both the inner 22 and the outer 24 races include a pair of axially spaced annular faces, 32 and 34 respectively, which radially border each side of the annular space 26. The inner race 22, in the preferred embodiment, has a slightly greater axial width, measured between its two faces 32, than does the outer race 24. That width differential is exaggerated in the drawings for purposes of illustration, and may be quite small. A complement of caged bearing balls 36 is contained within the annular space 26, allowing the inner and outer races 22 and 24 to relatively rotate with low friction. Bearing 12 also includes a pair of rubbing seals, designated generally at 38, which snap fit to outer race 24 in conventional fashion on each side of annular space 26. Each rubbing seal 38 has a seal lip 40 that engages the inner race 22 to provide primary sealing to each side of the annular space 26. While rubbing seals 38 are not necessary to the invention in the broadest sense, they cooperate with other structure to provide additional advantages, as will be described below.

Radial bearings, like bearing 12, are often commercially available with rubbing seals 38 already in place, and with knurled grooves 30. Furthermore, radial bearings like bearing 12 are typically provided with annular faces, like 32 and 34, that are already precisely ground and axially spaced. That already existing precision is used in positioning the shields 16 during installation, as will be described below. Therefore, another advantage of the invention is that it allows a commercially available bearing to be used quite advantageously.

Referring again to FIG. 1, the pulley 14 is molded from a suitable plastic material, and has a belt engaging rim 42, an integral web 44 and a central hub 46. Pulley 14, when it is molded, is formed around the outside of outer race 24 so that the plastic material that forms hub 46 hardens in the knurled grooves 30 in the outside of the outer race 24. Therefore, pulley 14 is fixed to outer race 24, and rotates therewith. However, pulley 14 is not molded until after the shields 16, described next, are put in place.

Figure 3:
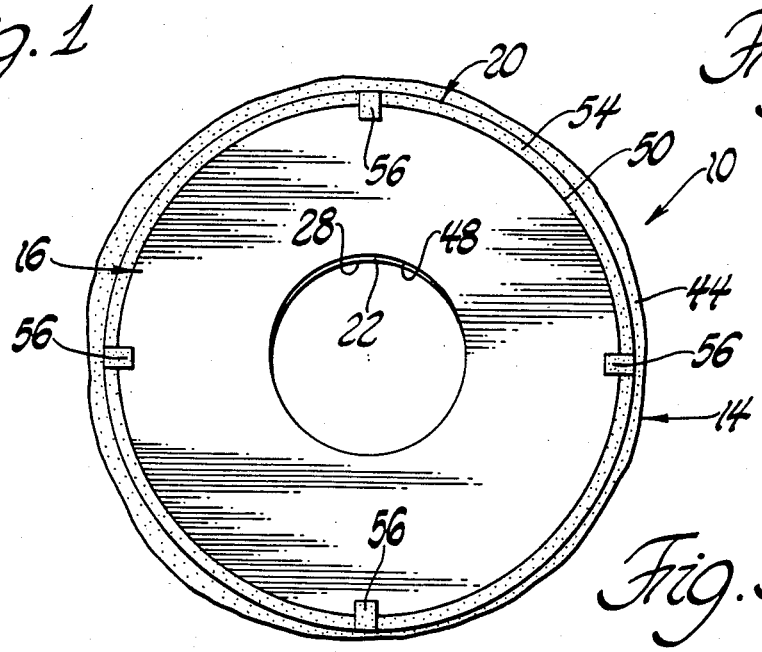
FIG. 3 is a view along the line 3—3 of FIG. 1.

Referring next to FIGS. 1 and 3, the shields 16 are generally flat annular members of identical size and shape, preferably stamped from relatively thin metal. Each shield 16 has an inner circular edge 48 with a diameter substantially equal to the diameter of the central bore 28, and an outer circular edge 50 with a diameter somewhat larger than the diameter of the outside of the outer race 24. These dimensions assure that each shield 16 can cover one side of the annular space 26. The shields 16 together will cover each side of the annular space 26 so long as they are held in at least an approximate covering relation to annular space 26, as shown in FIG. 1. The inner circular edges 48 need not be exactly coaxial to the central bore 28. Also, the outer circular edges 50 will extend radially beyond the outside the outer race 24. The inner circular edges 48 and adjacent portions 52 provide a positioning portion that assures a precise positioning for each shield 16 when the combined assembly 10 is installed, as will be described below. Furthermore, the outer circular edges 50 serve as an attachment portion for joining the shields 16 to the pulley 14, as described next.

Still referring to FIGS. 1 and 3, before the pulley 14 is molded, a shield 16 is placed in approximate covering relation to each side of the annular space 26. As shown, the inner circular edges 48 are not so far displaced from the central bore 28 as to interfere with fitting the cylindrical shaft 18 through central bore 28, further described below. The bearing 12 and the approximately positioned shields 16 are then placed into a suitable mold, not illustrated. Since the inner and outer races 22 and 24 do not have a large width differential, and since the shields 16 are thin enough to be partially flexible, they may be pressed against the outer race faces 34, as well as against the inner race faces 32, while in the mold. A suitable plastic material is then injected into the mold to form the pulley 14 around the outside of the outer race 24 as described above. Pressing the shields 16 against the outer race faces 34 prevents the plastic material that forms hub 46 from moving past the faces 34 as the pulley 14 is molded. The interior of the mold is shaped so that, as the pulley 14 is being molded, a portion of the plastic material forms a thin ring 54 surrounding each outer circular edge 50, with a plurality of four tabs 56 extending from each ring 54 and over each outer circular edge 50. The tabs 56, which are best seen in FIG. 3, comprise the frangible means 20 referred to above.

After removal from the mold, the completed combined assembly 10 appears as in FIG. 1. As they are released from the mold, the shields 16 flex back to their original shape, thereby leaving a slight clearance from the hub 46 as well as a slight axial clearance from the outer race faces 34. Again, those clearances are exaggerated for ease for illustration. The flexing back of shields 16 will also place tabs 56 under some tension, but they are sufficiently strong to withstand that tension and to join the shields 16 to the pulley 14, thereby unitizing the combined assembly 10. In addition, the rings 54 help to maintain the shields 16 in radial position after molding. The combined assembly 10 may therefore be shipped and installed as a unit. After installation, however, the tabs 56 are intended to fracture, as described next, so the unitization is temporary.

Figure 2:
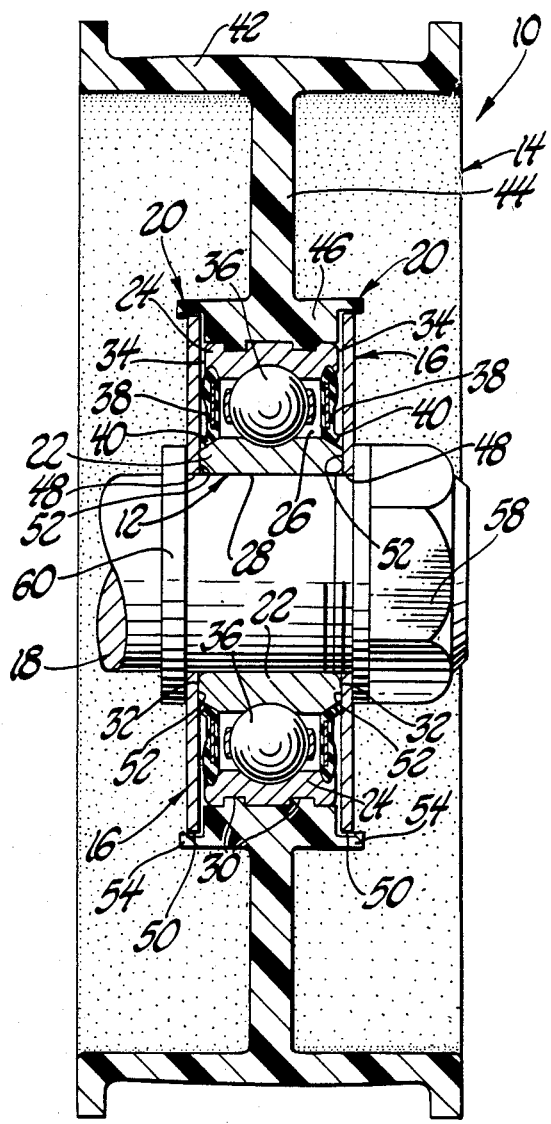
FIG. 2 is a cross sectional view of the preferred embodiment of the invention after installation.

Referring next to FIG. 2, the combined assembly 10 is installed by fitting the cylindrical shaft 18 through the inner race central bore 28 and then fixing the inner race 22 to the shaft 18 between a nut and washer assembly 58 and a shoulder 60 on shaft 18. The shields 16 are thereby clamped against the inner race faces 32, fixing the shields 16 to inner race 22 so that they will not turn relative. During installation, the inner circular edge 48 of each shield 16 and the portion 52 adjacent to the inner circular edge 48 together provide a positioning portion for the shields 16. The inner circular edge 48 of each shield 16 engages the cylindrical shaft 18, which assures that each inner edge 48 is coaxial to central bore 28. The shields 16 are thereby precisely radially positioned in covering relation to each side of the annular space 26. There may be an eccentricity between an outer circular edge 50 and its respective ring 54, subsequent to installation, because of the shifting of a shield 16 as it is so radially positioned. If so, the ring 54 can be worn away by the harder metal of the outer circular edge 50 as the pulley 14 rotates to leave a radial clearance, as is shown in FIG. 2. Should a shield 16 be shifted enough, as it is so positioned, to strongly force an outer circular edge 50 into its respective ring 54, the ring 54 is thin enough to yield or fracture, so that the precise radial positioning of the shield 16 will not be jeopardized. Some wearing away of the rings 54 by the outer circular edges 50 will inevitably occur, due to their relative rotation, even if they are substantially concentric after installation. Concurrently with the radial positioning, the clamping of the shield portions 52 tightly against the inner race faces 32 also precisely axially positions the shields 16 in covering relation to the annular space 26, with each shield 16 having a slight axial clearance from a respective outer race face 34. This axial positioning and clearance of the shields 16 is obtained from the axial precision already ground into the race faces 32 and 34, and occurs essentially automatically during installation.

Still referring to FIG. 2, the tabs 56 are not sufficiently strong to withstand the force of relative rotation between the inner race 22, to which the shields 16 are fixed, and the pulley 14, to which the tabs 56 are molded. Therefore, after installation of the combined assembly 10, the tabs 56 fracture in response to initial relative rotation between the pulley 14 and inner race 22, thereby allowing free subsequent relative rotation. Furthermore, after the tabs 56 fracture, the slight axial clearances of the shields 16 from the outer race faces 34 are radially opposed to any clearance that might occur from wear between the rubbing seal lips 40 and the inner race 22. Those radially opposed clearances can then cooperate to create, in effect, a labyrinth seal of each side of the annular space 26. The labyrinth seal works in addition to the primary sealing of the rubbing seals 38, although the shields 16 would still shield the annular space 26 between the races in the absence of rubbing seals 38. Therefore, the main benefits of the invention could be had without rubbing seals 38, although their use in conjunction with the invention yields an advantage beyond their primary sealing function.

Other variations of the preferred embodiment of the combined assembly 10 of the invention may be made within the spirit of the invention. Other frangible means may be used, although the integrally molded tabs 56 disclosed are conveniently and advantageously formed concurrently with the forming of the pulley 14, without any additional manufacturing steps. Rotatable members other than the pulley 14 could be formed, although the pulley 14 is particularly useful in automotive applications, as noted. While an axially narrower outer race 24 is disclosed to create an axial clearance of shields 16 from outer race faces 34, that clearance could be obtained otherwise. Shields 16 could, for example, be given a coating, such as an anti-corrosive coating, that is abradable. Then, even if outer race 24 were equal in width to the inner race 22, so that shields 16 initially rubbed against the outer race faces 34 after installation, subsequent relative rotation could wear away enough of the coating to create a clearance. The harder metal of the shields 16 would also wear away enough of the plastic material to create a clearance from hub 46. Therefore, it will be understood that the invention is capable of being embodied in structures other than that disclosed, and is not intended to be so limited.

The embodiments of the invention in which an exclusive property or privilege is claimed are defined as follows:

1. A combined bearing, rotatable member and shield assembly that is temporarily unitized prior to being installed on a support, comprising,
    a bearing having relatively rotatable inner and outer races defining an annular space therebetween with one of said races being adapted to be fixed on said support to thereby install said assembly,
    a rotatable member fixed to the other of said races so as to be rotatable relative to said one race,
    a shield adapted to cover one side of said annular space, said shield further including a positioning portion engageable with said support and one race when said assembly is installed on said support to thereby fix said shield relative to said one race and precisely position said shield in covering relation to said annular space,
    frangible means sufficiently strong to join said shield to said rotatable member in approximate covering relation to said one side of said annular space prior to installing said assembly, thereby temporarily unitizing said assembly, said frangible means being insufficiently strong to withstand the force of relative rotation between said rotatable member and said one race after said assembly is installed on said support, whereby said frangible means fractures in response to initial relative rotation between said rotatable member and one race to allow free subsequent relative rotation.

2. A combined bearing, rotatable member and shield assembly that is temporarily unitized prior to being installed on a support, comprising,
    a bearing having relatively rotatable inner and outer races defining an annular space therebetween with one of said races being adapted to be fixed on said support to thereby install said assembly, said bearing further including a rubbing seal on one side of said annular space having a seal lip engageable with said one race,
    a rotatable member fixed to the other of said races so as to be rotatable relative to said one race,
    a shield adapted to cover said one side of said annular space, said shield further including a positioning portion engageable with said support when said assembly is installed on said support to precisely radially position said shield in covering relation to said annular space, said positioning portion also being engageable with said one race to thereby fix said shield relative to said one race and precisely axially position said shield in covering relation to said annular space with a slight clearance from said other race,
    frangible means sufficiently strong to join said shield to said rotatable member in approximate covering relation to said one side of said annular space prior to installing said assembly, thereby temporarily unitizing said assembly, said frangible means being insufficiently strong to withstand the force of relative rotation between said rotatable member and said one race after said assembly is installed on said support, whereby said frangible means fractures in response to initial relative rotation between said rotatable member and one race to allow free subsequent relative rotation, said slight axial clearance of said shield from said other race then cooperating with said rubbing seal lip to effectively create a labyrinth seal of said annular space.

3. A combined bearing, rotatable member and shield assembly that is temporarily unitized prior to being installed on a support, comprising,
    a bearing having relatively rotatable inner and outer races defining an annular space therebetween with one of said races being adapted to be fixed on said support to thereby install said assembly,
    a rotatable member formed of a plastic material molded to the other of said races so as to be rotatable relative to said one race,
    a shield adapted to cover one side of said annular space, said shield further including a positioning portion engageable with said support and one race when said assembly is installed on said support to thereby fix said shield relative to said one race and precisely position said shield in covering relation to said annular space, said shield also including an attachment portion extending radially beyond said other race when said shield is placed in approximate covering relation to said annular space prior to said rotatable member being molded to said other race, so that, when said rotatable member is molded to said other race, a frangible means comprising a portion of said plastic material may be molded integrally with said rotatable member and over said shield attachment portion, said plastic material portion being sufficiently strong to join said shield to said rotatable member in approximate covering relation to said one side of said annular space prior to installing said assembly, thereby temporarily unitizing said assembly, said plastic material portion being insufficiently strong to withstand the force of relative rotation between said rotatable member and said one race after said assembly is installed on said support, whereby said plastic material portion fractures in response to initial relative rotation between said rotatable member and one race to allow free subsequent relative rotation.

* * * * *